UNITED STATES PATENT OFFICE.

CHARLES W. MERRILL, OF LEAD, SOUTH DAKOTA.

PROCESS OF TREATING PRECIOUS-METAL-BEARING MATERIALS.

No. 801,470.   Specification of Letters Patent.   Patented Oct. 10, 1905.

Application filed December 28, 1904. Serial No. 238,668.

*To all whom it may concern:*

Be it known that I, CHARLES W. MERRILL, a citizen of the United States, and a resident of Lead, in the county of Lawrence, State of South Dakota, have invented certain new and useful Improvements in Processes of Treating Precious-Metal-Bearing Materials, of which the following is a specification.

My invention relates to an improvement in the art of treating precious-metal-bearing material, particularly those ores or tailings which contain reducing salts or minerals with cyanogen-bearing solutions; and it consists in subjecting the particles of said precious-metal-bearing material to the action of an oxidizing agent after the removal of the liquid when there present from the interstitial spaces and before bringing the cyanogen-bearing solution in contact with said precious-metal-bearing material.

In the usual method of treating ores, tailings, or like precious-metal-bearing materials with alkaline cyanid solutions it is often found, by reason of the presence in the material which is being treated of reducing salts or minerals or for other reasons, that the dissolving action of cyanogen-bearing solutions on the precious metals is reduced to nothing or much diminished, because this reducing material, or compounds yielding reducing material, which is frequently present in large quanties, abstracts the dissolved oxygen from the solution, which dissolved oxygen is essential to the dissolution of the precious-metal contents. Furthermore, certain reducing materials, such as ferrous compounds, have a greater affinity for potassium cyanid than the corresponding higher chemical combinations, such as ferric compounds, and consequently by first bringing lower compounds to a higher state of oxidation by the introduction of some kind of oxidizing agent, such as atmospheric air, a material saving is effected in the consumption of the cyanogen, which is in itself an expensive reagent. In practice it has been found difficult, tedious, and often impossible to oxidize all or part of the reducing material when the interstitial spaces of the precious-metal-bearing material are filled with liquid or with a quiescent gas not under pressure. When, however, crushed metal-bearing material is collected in a container, the liquid when there present removed from the interstitial spaces, and atmospheric air or other oxidizing agent is applied thereto under pressure, the effect of the oxidizing agent upon the reducing substances is very much greater, for the reason that in this manner an envelop of oxidizing agent under pressure is formed around the particles of solid matter and the said contact or envelop is maintained and renewed when necessary until part or all of the reducing material has been oxidized, after which the air or other oxidizing agent is then displaced and the metallurgical treatment continued.

As is well known, all methods of crushing ore are divided, generally speaking, into what is known as "dry" crushing and "wet," crushing the latter necessitating the presence of liquid in the material. The effect of the liquid being present with the crushed ore is merely an incident to the operation and not essential, and hence in my process in the latter case prior to effecting oxidation preliminary to the contact of a cyanid solution the liquid is removed from the interstitial spaces. This may be effected by draining the containers in any convenient manner, after which the interstitial spaces are filled with the oxidizing agent, and the contact thus formed between the finely-divided metal-bearing material and the oxidizing agent is maintained until part or all of the reducing material has been oxidized. In the event of the crushed metal-bearing material having been charged in the container by what is known as the "dry" method—namely, one which does not leave the interstitial spaces filled with the liquid—the same process is pursued, except that in this alternative it is not necessary to remove liquid from the interstitial spaces for the purposes of attaining the first oxidation.

The process may be conducted in any form of a container to which the oxidizing agent may be applied under pressure after the removal of any liquid when there present from the interstitial spaces.

I claim as my invention—

1. The improvement in treating precious-metal-bearing material with cyanogen-bearing solutions after crushing, consisting in removing the liquid when there present from the interstitial spaces of the crushed material, then applying an oxidizing agent under pressure to said material, and subsequently bringing the cyanogen-bearing solution in contact with said material.

2. The improvement in treating precious-metal-bearing materials with cyanogen-bearing solutions after crushing, consisting in removing the liquid when there present from the interstitial spaces of the crushed material, then applying atmospheric air under pressure to said material, and subsequently bringing the cyanogen-bearing solution in contact with said material.

3. The improvement in treating precious-metal-bearing materials with cyanogen-bearing solutions after crushing, consisting in removing any liquid when there present from the interstitial spaces of the crushed material, then applying atmospheric air under pressure to said material, and subsequently bringing the cyanogen-bearing solution in contact with said material, in one and the same container.

4. The improvements in treating precious-metal-bearing material containing reducing agents, with cyanogen-bearing solutions consisting in first collecting said material in a container and after removal of the liquid when there present from the interstitial spaces, oxidizing all or part of the reducing agent by means of the oxygen of compressed air brought into contact with the material in the same container in which the subsequent contact with the cyanogen-bearing solutions is to take place, and subsequently bringing the cyanogen-bearing solutions into contact with said materials in said container.

In testimony that I claim the foregoing as my invention I have signed my name, in presence of two witnesses, this 22d day of December, 1904.

CHARLES W. MERRILL.

Witnesses:
WM. FRACKELTON,
GEO. D. FOGLESONG.